US011252312B2

(12) United States Patent
Pan et al.

(10) Patent No.: US 11,252,312 B2
(45) Date of Patent: Feb. 15, 2022

(54) LENS BRACKET ASSEMBLY AND GIMBAL USED THEREWITH

(71) Applicant: SZ DJI OSMO TECHNOLOGY CO., LTD., Shenzhen (CN)

(72) Inventors: Paul Pan, Shenzhen (CN); Xi Feng Zhao, Shenzhen (CN); Yan Chong Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/926,084

(22) Filed: Jul. 10, 2020

(65) Prior Publication Data

US 2020/0344388 A1    Oct. 29, 2020

Related U.S. Application Data

(63) Continuation of application No. 16/195,281, filed on Nov. 19, 2018, now Pat. No. 10,715,704, which is a
(Continued)

(51) Int. Cl.
*H04N 5/225* (2006.01)
*F16M 11/18* (2006.01)
(Continued)

(52) U.S. Cl.
CPC .......... *H04N 5/2253* (2013.01); *F16M 11/04* (2013.01); *F16M 11/041* (2013.01);
(Continued)

(58) Field of Classification Search
None
See application file for complete search history.

(56) References Cited

U.S. PATENT DOCUMENTS 3,767,095 A * 10/1973 Jones ................. F16M 11/24
224/261
5,625,853 A * 4/1997 Ihara .................. F16M 11/041
396/419
(Continued)

FOREIGN PATENT DOCUMENTS

CN        2265470 Y     10/1997
CN      201014153 Y      1/2008
(Continued)

OTHER PUBLICATIONS

S.C.V. Photography ideas the basic long lens support bracket idea part 2, Vlachos, Oct. 25, 2011 (Year: 2011).*
(Continued)

*Primary Examiner* — James M Hannett
(74) *Attorney, Agent, or Firm* — Anova Law Group, PLLC

(57) ABSTRACT

A lens bracket assembly for supporting an imaging device. The imaging device includes a body and a lens connected to the body. The lens bracket assembly includes a mounting plate, a supporting plate configured for carrying the imaging device, and a bracket. The mounting plate includes a first surface and two inner sidewalls extended from two opposing ends of the first surface along a direction substantially perpendicular to the first surface. The two inner sidewalls provide first sliding slots. The supporting plate includes a first side and two outer sidewalls providing second sliding slots, and is slidably disposed on the mounting plate with the second sliding slots matching the first sliding slots at corresponding positions. The bracket is coupled to the first side of the supporting plate, and includes a shape that matches the lens of the imaging device.

19 Claims, 9 Drawing Sheets

Related U.S. Application Data continuation of application No. 15/380,161, filed on Dec. 15, 2016, now Pat. No. 10,136,038, which is a continuation of application No. PCT/CN2014/081046, filed on Jun. 27, 2014.

(51) Int. Cl.
 *G03B 17/56*  (2021.01)
 *F16M 11/04*  (2006.01)
 *F16M 13/04*  (2006.01)
 *F16M 11/20*  (2006.01)
 *F16M 11/12*  (2006.01)

(52) U.S. Cl.
 CPC ......... *F16M 11/048* (2013.01); *F16M 11/123* (2013.01); *F16M 11/18* (2013.01); *F16M 11/2035* (2013.01); *F16M 11/2057* (2013.01); *F16M 11/2085* (2013.01); *F16M 13/04* (2013.01); *G03B 17/563* (2013.01); *G03B 17/566* (2013.01); *H04N 5/2254* (2013.01)

(56) References Cited

U.S. PATENT DOCUMENTS

| | | | |
|---|---|---|---|
| 6,196,504 | B1 | 3/2001 | Lemke |
| 6,795,648 | B1* | 9/2004 | Ross ................ G03B 13/24 396/150 |
| 8,678,678 | B2* | 3/2014 | Imura ................ G03B 17/565 396/419 |
| D723,090 | S | 2/2015 | Firchau et al. |
| 9,574,703 | B2* | 2/2017 | Firchau ................ F16M 11/24 |
| 2005/0041966 | A1 | 2/2005 | Johnson |
| 2014/0099092 | A1 | 4/2014 | Di Leo |
| 2014/0161434 | A1 | 6/2014 | Koymen |
| 2014/0267805 | A1* | 9/2014 | Webb ................ H04N 5/23258 348/208.2 |

FOREIGN PATENT DOCUMENTS

| | | |
|---|---|---|
| CN | 201340508 Y | 11/2009 |
| CN | 201479247 U | 5/2010 |
| CN | 201804197 U | 4/2011 |
| CN | 102313908 A | 1/2012 |
| CN | 202647108 A | 1/2013 |
| CN | 203147216 U | 8/2013 |
| CN | 203224710 U | 10/2013 |
| CN | 203502721 U | 3/2014 |
| CN | 203907157 U | 10/2014 |
| EP | 2743559 A2 | 6/2014 |
| JP | S60107694 U | 7/1985 |
| JP | S62154440 A | 9/1987 |
| JP | H08122605 A | 5/1996 |
| JP | H11282081 A | 10/1999 |
| JP | 3064514 U | 1/2000 |
| JP | 2003161998 A | 6/2003 |
| JP | 2004258633 A | 9/2004 |
| JP | 2005181405 A | 7/2005 |
| JP | 2006330083 A | 12/2006 |
| JP | 2008122605 A | 5/2008 |
| JP | 2010282039 A | 12/2010 |
| WO | 2012109351 A1 | 8/2012 |
| WO | 2013086173 A1 | 6/2013 |

OTHER PUBLICATIONS

Printout of the webpage https://v.youku.com/v_show/id_XNzMxNj4MTE2.html?from=s1.8-1-1.2$spm=a2h0k.8191407.0.0.

Notfication of Reasons for Refusal from the Japanese Patent Office, in counterpart Japanese Application No. 2016-563823 dated Jul. 21, 2017.

The World Intellectual Property Organization (WIPO) International Search Report for No. PCT/CN2014/081046 dated Mar. 27, 2015 3 pages.

* cited by examiner

LENS BRACKET ASSEMBLY AND GIMBAL USED THEREWITH

CROSS-REFERENCE TO RELATED APPLICATIONS

This application is a continuation application of U.S. application Ser. No. 16/195,281, filed on Nov. 19, 2018, now U.S. Pat. No. 10,715,704, which is a continuation application of U.S. application Ser. No. 15/380,161, filed on Dec. 15, 2016, now U.S. Pat. No. 10,136,038, which is a continuation application of International Application No. PCT/CN2014/081046 filed on Jun. 27, 2014, the contents of all of which are hereby incorporated by reference in their entirety.

BACKGROUND OF THE DISCLOSURE

The present disclosure relates to the field of shooting apparatuses, and in particular, to a lens bracket assembly and a gimbal used therewith.

A gimbal is used for mounting a supporting worktable used by a video camera, the video camera being disposed on the gimbal. By adjusting the gimbal, the lens of the video camera is adjusted to achieve correct photographing of targets. The gimbal is compatible with lots of different types of video cameras or lenses, and the center of gravity of each axis of the gimbal is adjustable. However, as the existing structure of adjusting the center of gravity adjusts the center of gravity by use of relative displacement of the gimbal structure, and as most of the structural members carry load, the static friction force between the structural members is very great, causing the relative movement to be difficult. Moreover, a small relative displacement also affects the center of gravity significantly, causing adjustment of the center of gravity to be difficult.

In addition, it is difficult to mount the existing video camera and gimbal. The steps of mounting are more complicated. Structural deformation is large during locking, and bad connections are resulted. As a result, the gimbal has poor system stiffness, and it is very difficult to increase the precision. Poor connection stiffness between some video cameras and lenses is also one of the reasons for leading to poor system stiffness of the gimbal.

BRIEF SUMMARY OF THE DISCLOSURE

An objective of the present disclosure is to provide a lens bracket assembly, and a gimbal used with the assembly, to be rapidly adjusted to balance the center of gravity and to increase stiffness between a lens and a body of an imaging device.

An embodiment of the present disclosure is implemented as follows. A lens bracket assembly for supporting an imaging device is provided. The imaging device includes a body and a lens connected to the body, and the lens bracket assembly includes a supporting plate which is used for mounting the imaging device and includes a first side. The lens bracket assembly further includes a bracket including a supporting portion of which the shape matches the lens of the imaging device and a fixing portion connected with the supporting portion. The fixing portion is fixedly arranged at the first side, and the supporting portion is used for supporting the lens.

The first side is provided with a first fixing hole. The fixing portion is provided with a guide hole. The lens bracket assembly further includes a fixing member. The fixing member is a latch, and includes an assemble-in portion and an abutting portion connected to the assemble-in portion. The assemble-in portion passes through the guide hole and the first fixing hole, and the abutting portion abuts against the fixing portion.

The first side of the supporting plate is further provided with two second fixing holes. The lens bracket assembly further includes a connecting member disposed between the first side and the bracket. The connecting member includes a connecting portion provided thereon with a first through hole and two second through holes at positions corresponding to the first fixing hole and the second fixing holes of the supporting plate, respectively. The two second through holes are aligned with the two second fixing holes, respectively. Two latches are inserted into the second through holes and the second fixing holes to fix the connecting member onto the first side of the supporting plate, and the assemble-in portion further passes through the first through hole.

The length of the assemble-in portion is equal to the sum of the depth of the first fixing hole, the depth of the first through hole and the depth of the guide hole.

The connecting member further includes a connecting portion and two cylindrical fastening posts disposed on two sides of the connecting portion, and the fixing portion is clamped between the two fastening posts.

The width of the fixing portion is equal to the shortest distance between the two fastening posts.

The lens bracket assembly further includes a mounting plate. The supporting plate is slidably disposed on the mounting plate. The mounting plate includes a first surface and two first sidewalls disposed oppositely. A first boss is extended from the first surface at each of two opposing ends of the first surface. Inner sidewalls of the two first bosses are provided with a first sliding slot, respectively, and two outer sidewalls of the supporting plate are provided with second sliding slots, respectively, which match the first sliding slots, at positions corresponding to the first sliding slots.

The first sliding slots and the second sliding slots are both dovetail sliding slots.

One of the first sidewalls is provided with a receiving groove. The lens bracket assembly further includes a pressing device. The pressing device includes a sliding block slidably disposed in the receiving groove. The sliding block includes a first side face close to a bottom of the receiving groove. A clamping portion is extended from the first side face in a direction in which the first side face gets close to the bottom and is used for locking the supporting plate to the mounting plate. When the sliding block is retained in the second sliding slot, the supporting plate and the mounting plate are locked through the clamping portion.

The bottom of the receiving groove is provided with a threaded hole. The pressing device further includes a spring, a fixing bolt, a pin, and a wrench. The spring is disposed between the bottom and the first side face. The sliding block further includes a second side face away from the first side face. The wrench is disposed on the second side face. The wrench is provided with a first through hole for receiving the pin, and the fixing bolt sequentially passes through the pin, the sliding block, and the spring to be connected with the threaded hole by threading.

The second side face is provided with a rectangular-ambulatory-plane first receiving groove. A column is formed in a central part of the first receiving groove. The column is provided with a round through hole for the fixing bolt to pass through The pressing device further includes a washer, the shape and size of the washer match those of the first receiving groove, respectively, and the washer is received in the first receiving groove and is in contact with the wrench.

The thickness of the washer is greater than or equal to that of the first receiving groove.

The washer is made of polyoxymethylene (POM).

The receiving groove includes two side faces disposed perpendicularly to the bottom. The two side faces are disposed oppositely and are provided thereon with a first sliding portion, respectively. The two outer sidewalls of the supporting plate are provided with second sliding portions, which match the respective first sliding portions.

The first sliding portions are sliding slots, and the second sliding portions are sliders.

The first sliding portions are sliders, and the second sliding portions are sliding slots.

The receiving groove extends from the first sidewall towards a center of the first surface. The receiving groove penetrates part of the first boss to cause the first boss to form a notch. The notch is in communication with the receiving groove. The clamping portion protrudes beyond the first side face. The clamping portion forms an inclined face inclining with respect to the first side face. When the sliding block is retained in the second sliding slot, the inclined face is received in the notch.

The lens bracket assembly further includes a first adaptor including a first pressing block and a second pressing block disposed oppositely. Two round slots are formed between the first pressing block and the second pressing block. The first pressing block and the second pressing block are jointly screwed by a first screw. The mounting plate is fixed onto the second pressing block, and a nut of the first screw is fixedly arranged at a first wrench.

An embodiment of the present disclosure is implemented as follows. A gimbal for carrying an imaging device is provided. The gimbal includes a first support frame, a second support frame hinged to the first support frame and capable of driving the first support frame to rotate, and a third support frame hinged to the second support frame and capable of driving the second support frame to rotate. The first support frame includes two first pillars and two guiding posts, the two guiding posts being disposed substantially perpendicular to the two first pillars, and the two guiding posts being used for carrying the imaging device. The gimbal further includes the lens bracket assembly as described above which is disposed on the guiding posts.

The first pillars, the guiding posts, and the third support frame are all hollow. Inner walls of the first pillars, the guiding posts and the third support frame are all provided with internal threads. A body portion of the driving device is provided with external threads, and the external threads mate with the internal threads to cause a driving device to be fixedly connected with the first pillars, the guiding posts, or the third support frame.

The second support frame includes two second pillars and a first driving device. One of the second pillars is hinged to a rotating shaft of one of the first pillars. The other one of the second pillars is hinged to a rotating shaft of the other one of the first pillars through the first driving device.

The third support frame includes a third pillar, a second driving device, and a connecting plate. The second driving device is rotationally connected with the second pillars for driving the second support frame. The second driving device is fixed to one end of the third pillar. A driving shaft of the second driving device is fixedly connected with the second pillar for driving the second pillar to rotate to drive the second support frame to rotate, and the other end of the third pillar is connected to the connecting plate.

The gimbal further includes a driving portion and a handle portion. The driving portion is a brushless motor. A rotor thereof of the driving portion is connected to the connecting plate, while a stator of the driving portion is fixed to the handle portion. The driving portion is used for driving the third support frame to rotate.

The first side is provided with a first fixing hole. The fixing portion is provided with a guide hole. The lens bracket assembly further includes a fixing member. The fixing member is a latch. The fixing member includes an assemble-in portion and an abutting portion connected to the assemble-in portion. The assemble-in portion passes through the guide hole and the first fixing hole, and the abutting portion abuts against the fixing portion.

The first side of the supporting plate is further provided with two second fixing holes. The lens bracket assembly further includes a connecting member disposed between the first side and the bracket. The connecting member includes a connecting portion provided thereon with a first through hole and two second through holes at positions corresponding to the first fixing hole and the second fixing holes of the supporting plate, respectively. The two second through holes are aligned with the two second fixing holes, respectively. Two latches are inserted into the second through holes and the second fixing holes to fix the connecting member onto the first side of the supporting plate, and the assemble-in portion further passes through the first through hole.

The length of the assemble-in portion is equal to the sum of the depth of the first fixing hole, the depth of the first through hole and the depth of the guide hole.

The connecting member further includes a connecting portion and two cylindrical fastening posts disposed on two sides of the connecting portion, and the fixing portion is clamped between the two fastening posts.

The width of the fixing portion is equal to the shortest distance between the two fastening posts.

The lens bracket assembly further includes a mounting plate. The supporting plate is slidably disposed on the mounting plate. The mounting plate includes a first surface and two first sidewalls disposed oppositely. A first boss is extended from the first surface at each of two opposing ends of the first surface. Inner sidewalls of the two first bosses are provided with a first sliding slot, respectively, and two outer sidewalls of the supporting plate are provided with second sliding slots, respectively, which match the first sliding slots, at positions corresponding to the first sliding slots.

The first sliding slots and the second sliding slots are both dovetail sliding slots.

One of the first sidewalls is provided with a receiving groove. The lens bracket assembly further includes a pressing device. The pressing device includes a sliding block slidably disposed in the receiving groove. The sliding block includes a first side face close to a bottom of the receiving groove. A clamping portion is extended from the first side face in a direction in which the first side face gets close to the bottom and is used for locking the supporting plate to the mounting plate. When the sliding block is retained in the second sliding slot, the supporting plate and the mounting plate are locked through the clamping portion.

The bottom of the receiving groove is provided with a threaded hole. The pressing device further includes a spring, a fixing bolt, a pin, and a wrench. The spring is disposed between the bottom and the first side face. The sliding block further includes a second side face away from the first side face. The wrench is disposed on the second side face. The wrench is provided with a first through hole for receiving the pin, and the fixing bolt sequentially passes through the pin, the sliding block, and the spring to be connected with the threaded hole by threading.

The second side face is provided with a rectangular-ambulatory-plane first receiving groove. A column is formed in a central part of the first receiving groove. The column is provided with a round through hole for the fixing bolt to pass through. The pressing device further includes a washer, the shape and size of the washer match those of the first receiving groove, respectively, and the washer is received in the first receiving groove and is in contact with the wrench.

The thickness of the washer is greater than or equal to that of the first receiving groove.

The washer is made of POM.

The receiving groove includes two side faces disposed perpendicularly to the bottom. The two side faces are disposed oppositely and are provided thereon with a first sliding portion, respectively. the two outer sidewalls of the supporting plate are provided with second sliding portions, which match the respective first sliding portions.

The first sliding portions are sliding slots, and the second sliding portions are sliders.

The first sliding portions are sliders, and the second sliding portions are sliding slots.

The receiving groove extends from the first sidewall towards a center of the first surface. The receiving groove penetrates part of the first boss to cause the first boss to form a notch. The notch is in communication with the receiving groove. The clamping portion protrudes beyond the first side face. The clamping portion forms an inclined face inclining with respect to the first side face. When the sliding block is retained in the second sliding slot, the inclined face is received in the notch.

The lens bracket assembly further includes a first adaptor including a first pressing block and a second pressing block disposed oppositely. Two round slots are formed between the first pressing block and the second pressing block. The first pressing block and the second pressing block are jointly screwed by a first screw. The mounting plate is fixed onto the second pressing block, and a nut of the first screw is fixedly arranged at a first wrench.

Compared with the conventional technologies, a bracket of the lens bracket assembly according to the present disclosure is fixed onto a supporting plate, an imaging device is mounted to the supporting plate, and the bracket supports a lens of the imaging device. Therefore, stiffness between the lens and a body of the imaging device is increased. In addition, the supporting plate is slidably disposed on the mounting plate, and the pressing device locks the supporting plate with the mounting plate. Therefore, the mounting plate can be locked to any predetermined position on the supporting plate through the pressing device, which increases the locking precision of the mounting plate. Moreover, the lens bracket assembly has a small volume and is easy to assemble and disassemble. The center of gravity of the gimbal can be adjusted through the lens bracket assembly.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings briefly described herein.

DETAILED DESCRIPTION OF THE EMBODIMENTS

The technical solution in embodiments of the present disclosure is clearly and completely described below with reference to the accompanying drawings of the embodiments of the present disclosure. It is apparent that the embodiments described are merely some embodiments of the present disclosure instead of all the embodiments. Based on the embodiments in the present disclosure, all other embodiments obtained by persons of ordinary skill in the art without making creative efforts should fall within the protection scope of the present disclosure.

Implementation of the present disclosure is described below in detail in combination with specific implementation manners.

Figure 1:
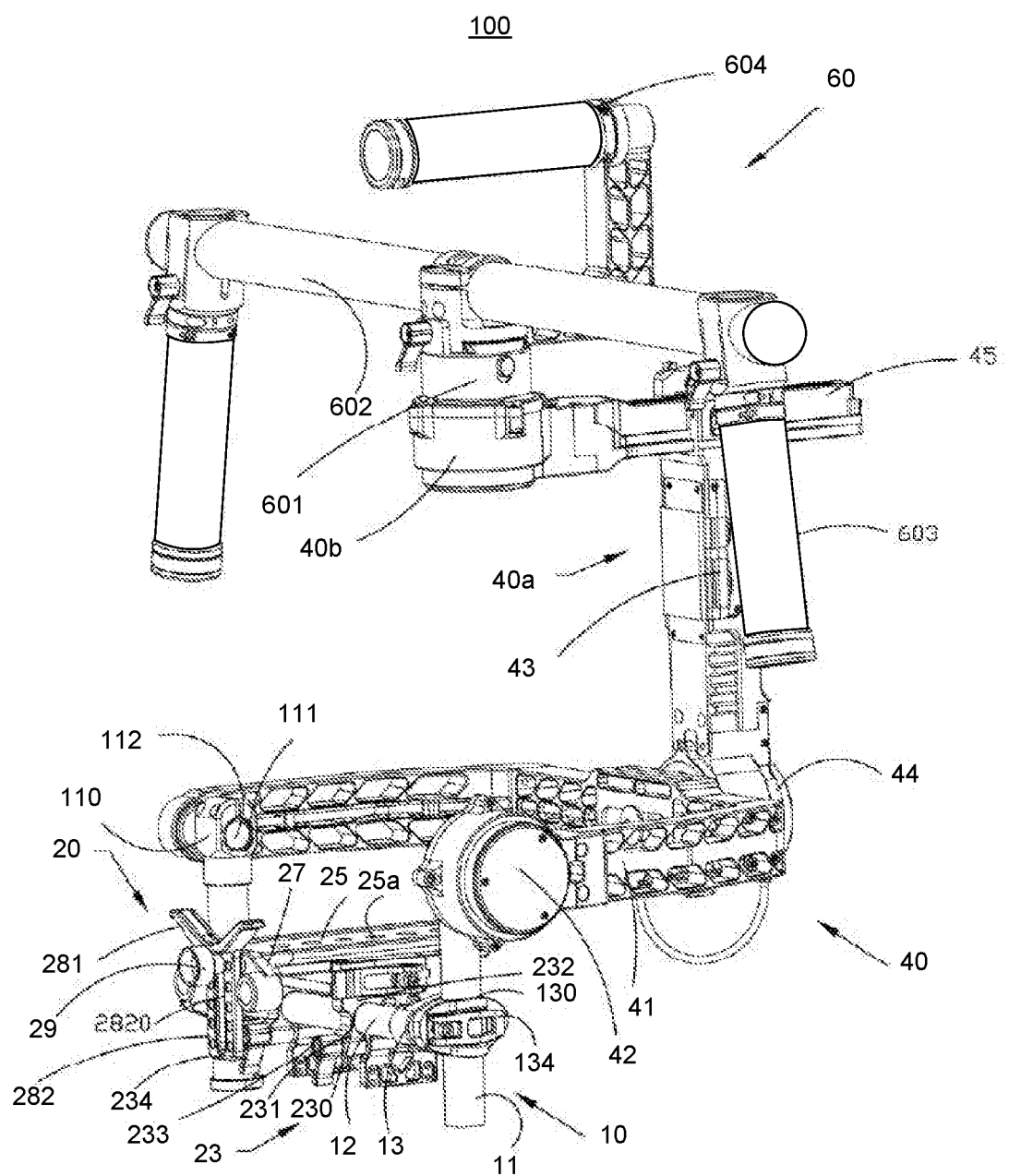
FIG. 1 is a schematic three-dimensional assembly diagram of a gimbal according to the present disclosure.
Figure 2:
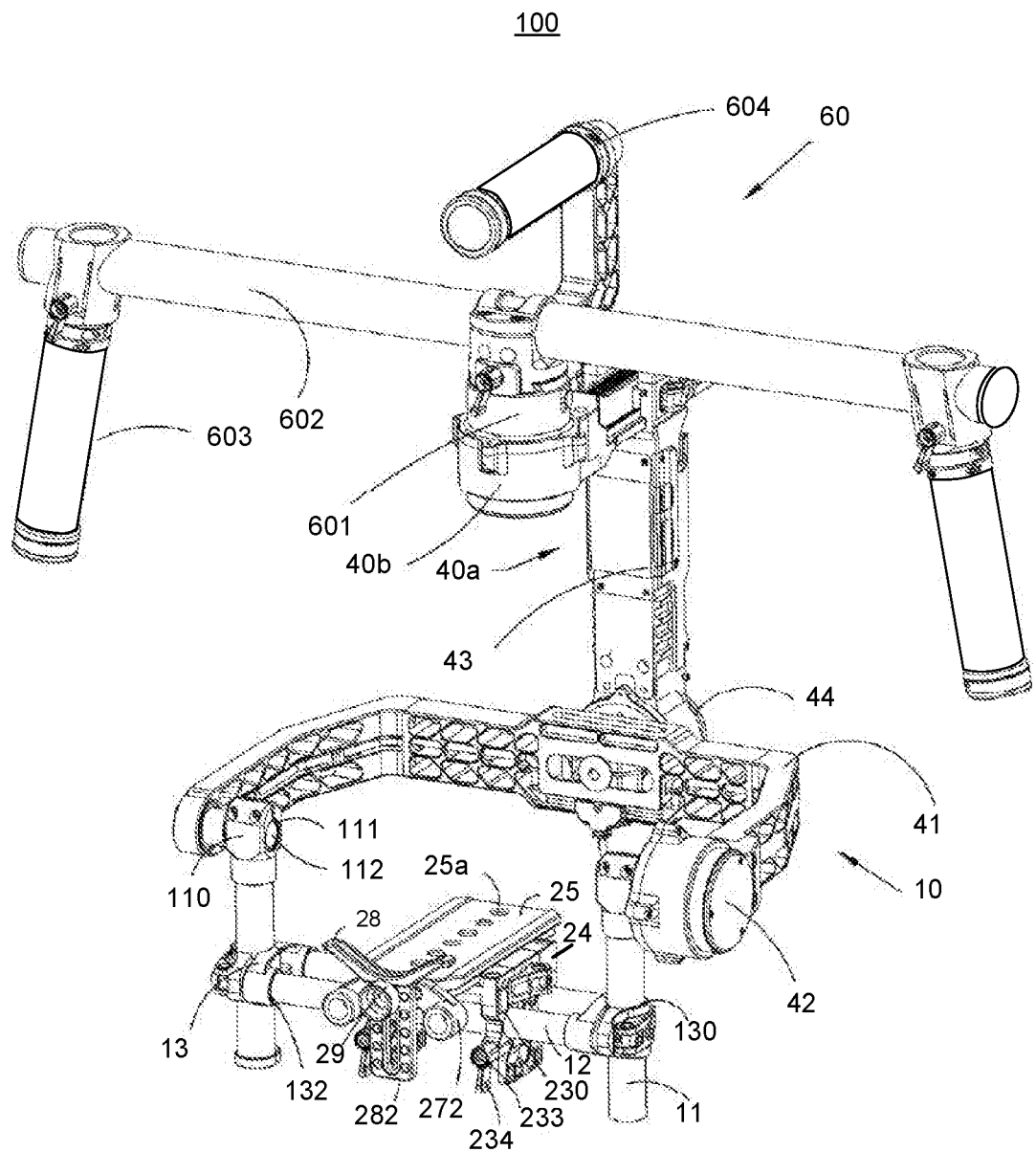
FIG. 2 is a schematic three-dimensional assembly diagram of another perspective view of the gimbal in FIG. 1.
Figure 3:
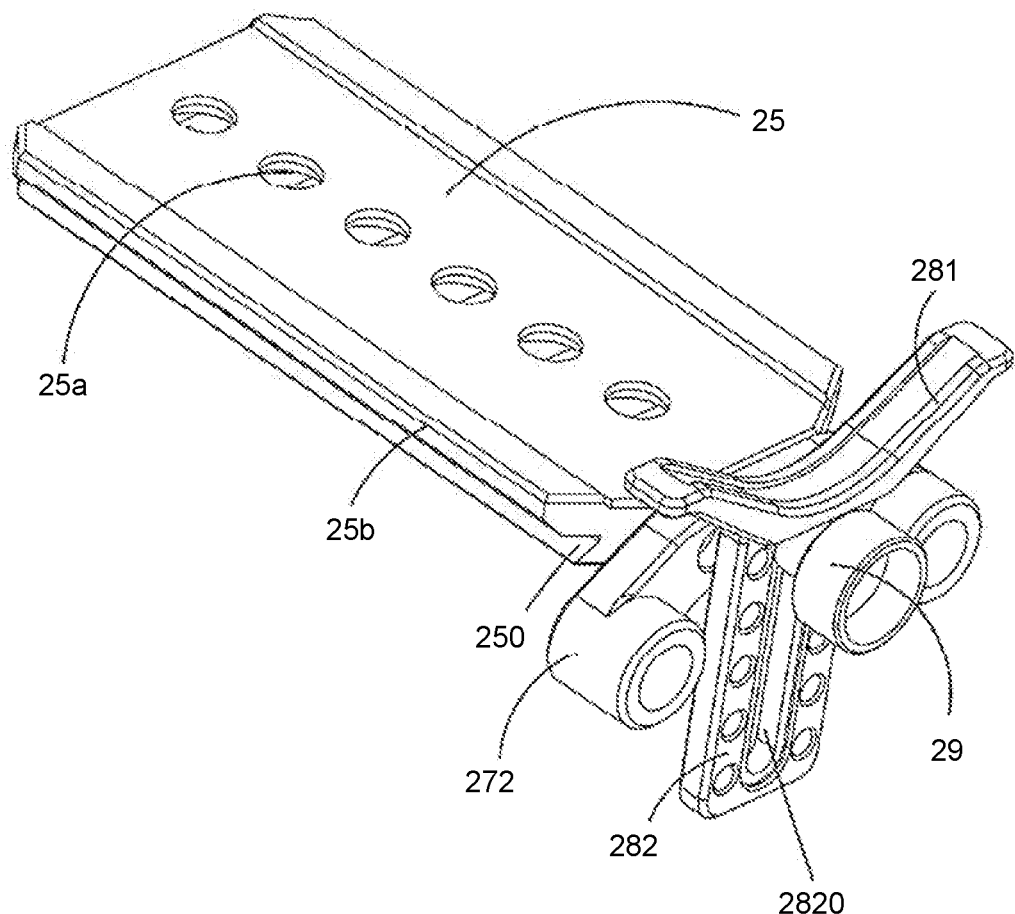
FIG. 3 is a schematic three-dimensional assembly diagram between a supporting plate, a bracket, a connecting member, and a fixing member in a lens bracket assembly in FIG. 1.
Figure 4:
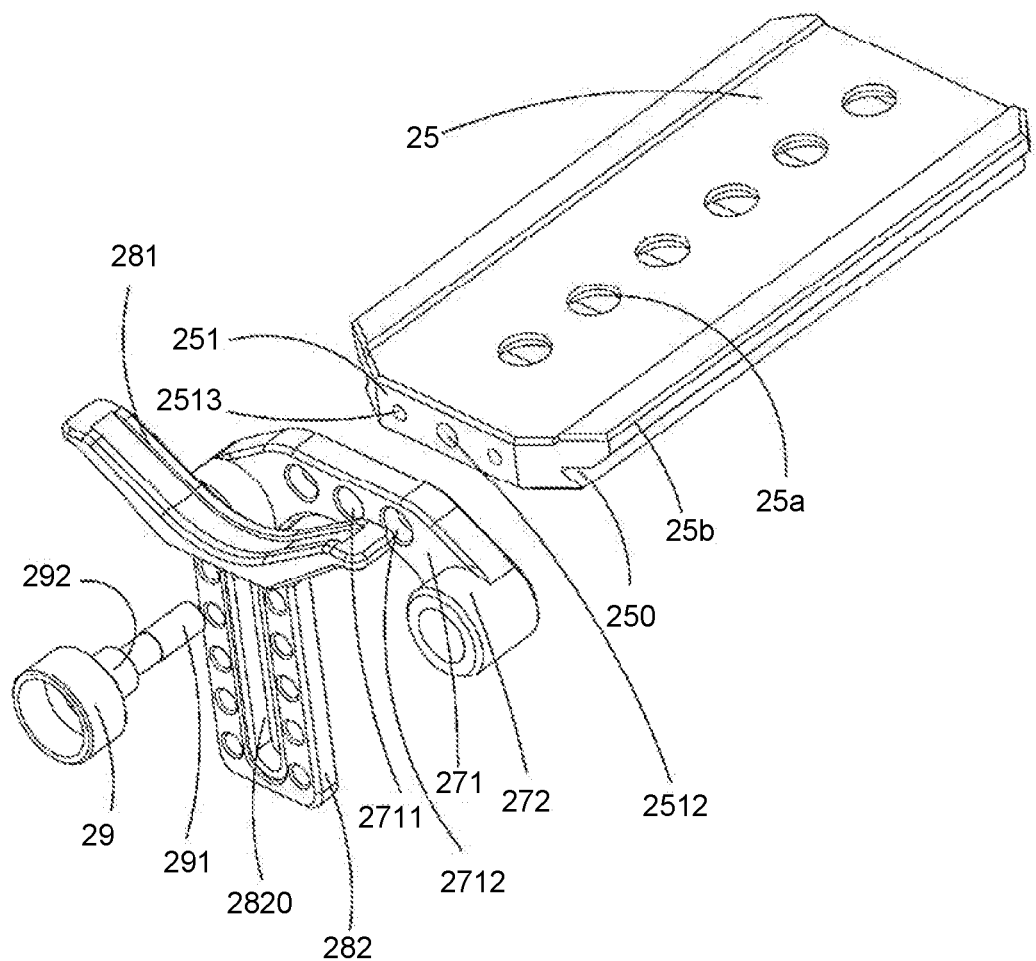
FIG. 4 is a schematic three-dimensional exploded diagram between the supporting plate, the bracket, the connecting member, and the fixing member in FIG. 3.
Figure 5:
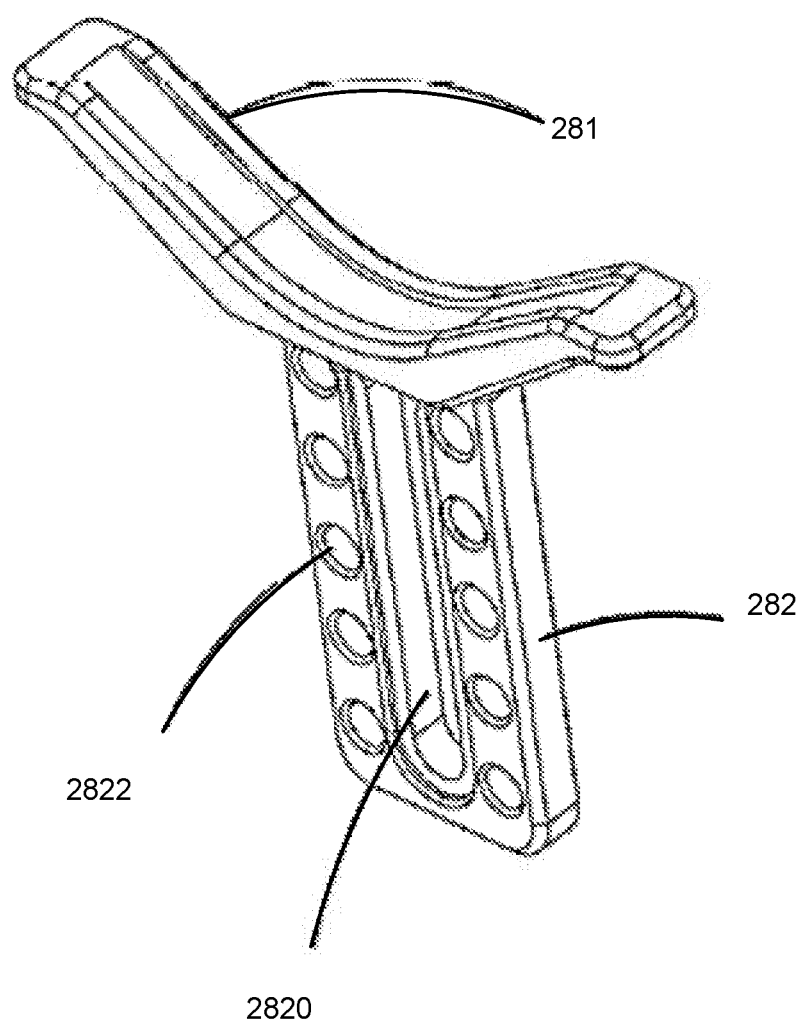
FIG. 5 is a three-dimensional diagram of a bracket in FIG. 1.
Figure 6:
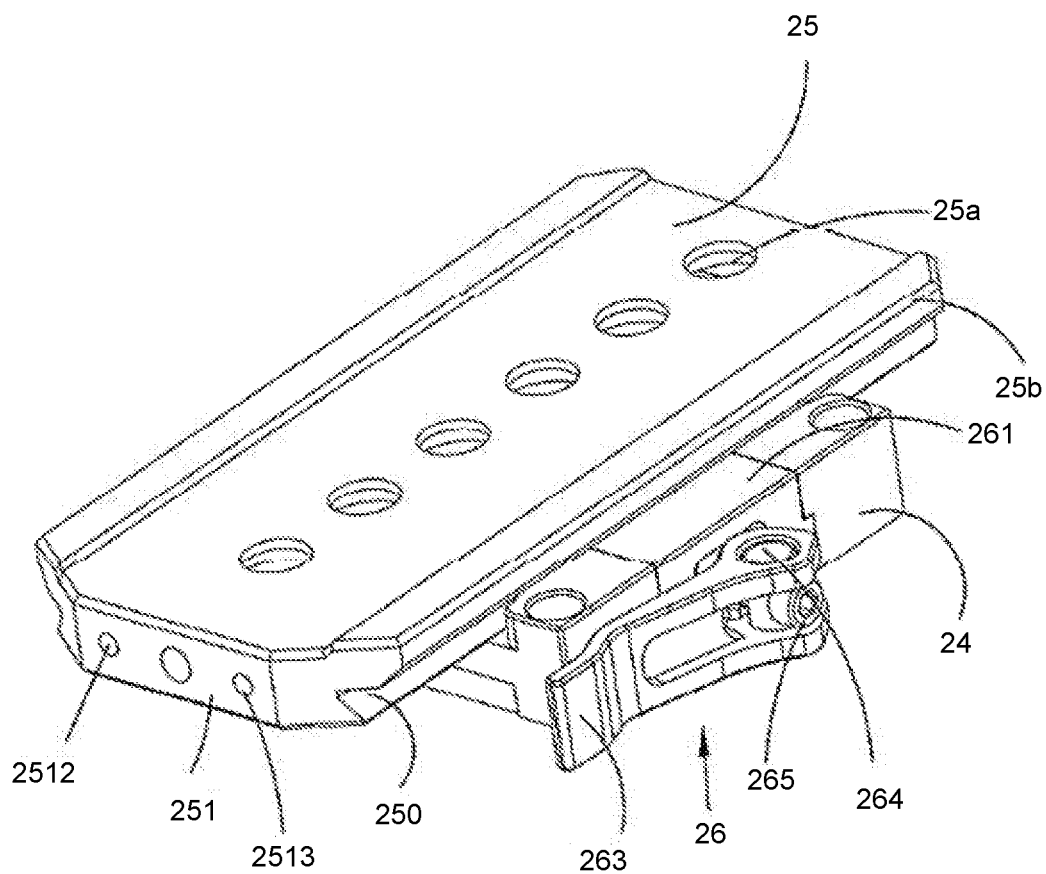
FIG. 6 is a schematic three-dimensional assembly diagram between a supporting plate, a mounting plate, a pressing device in a lens bracket assembly in FIG. 1.
Figure 7:
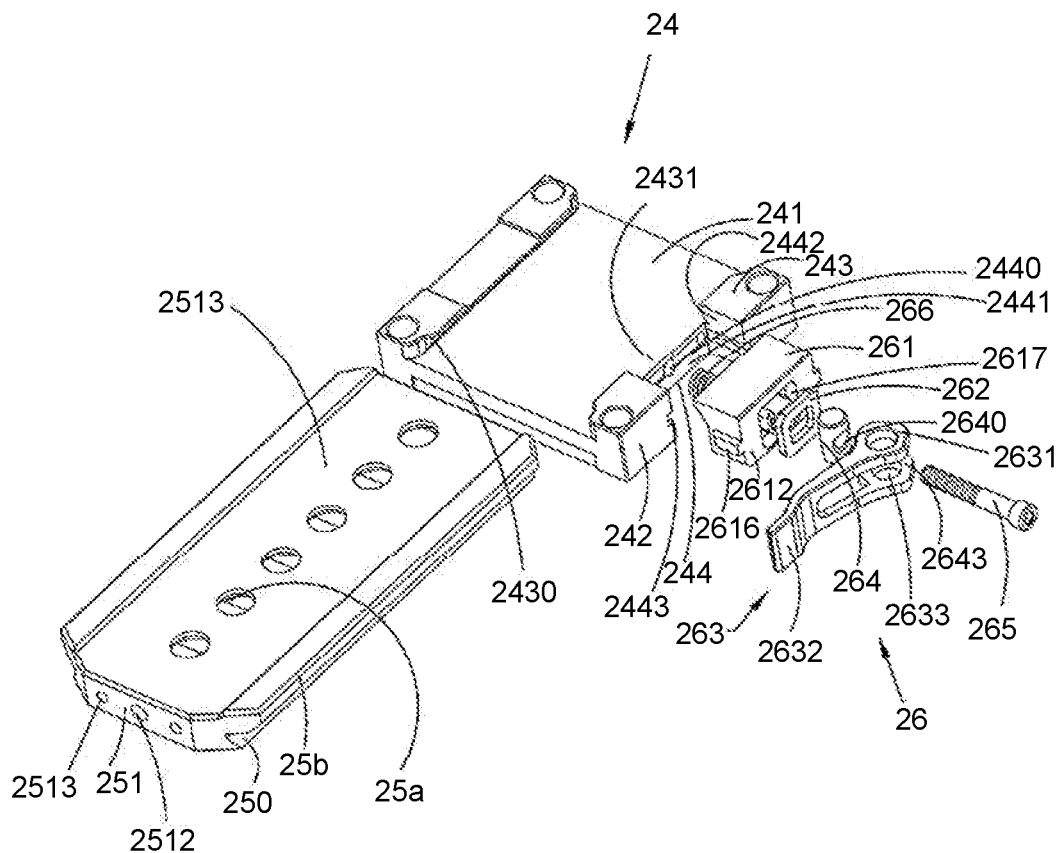
FIG. 7 is a schematic three-dimensional exploded diagram between the supporting plate, the mounting plate, and the pressing device in the lens bracket assembly in FIG. 6.
Figure 8:
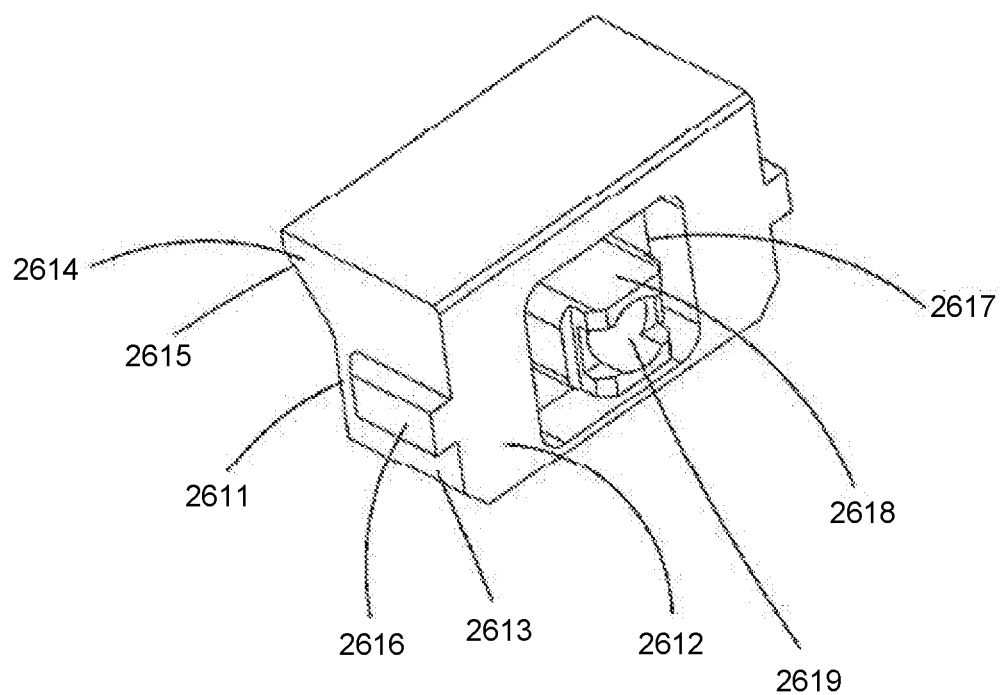
FIG. 8 is a schematic three-dimensional diagram of a sliding block in the pressing device in FIG. 7.
Figure 9:
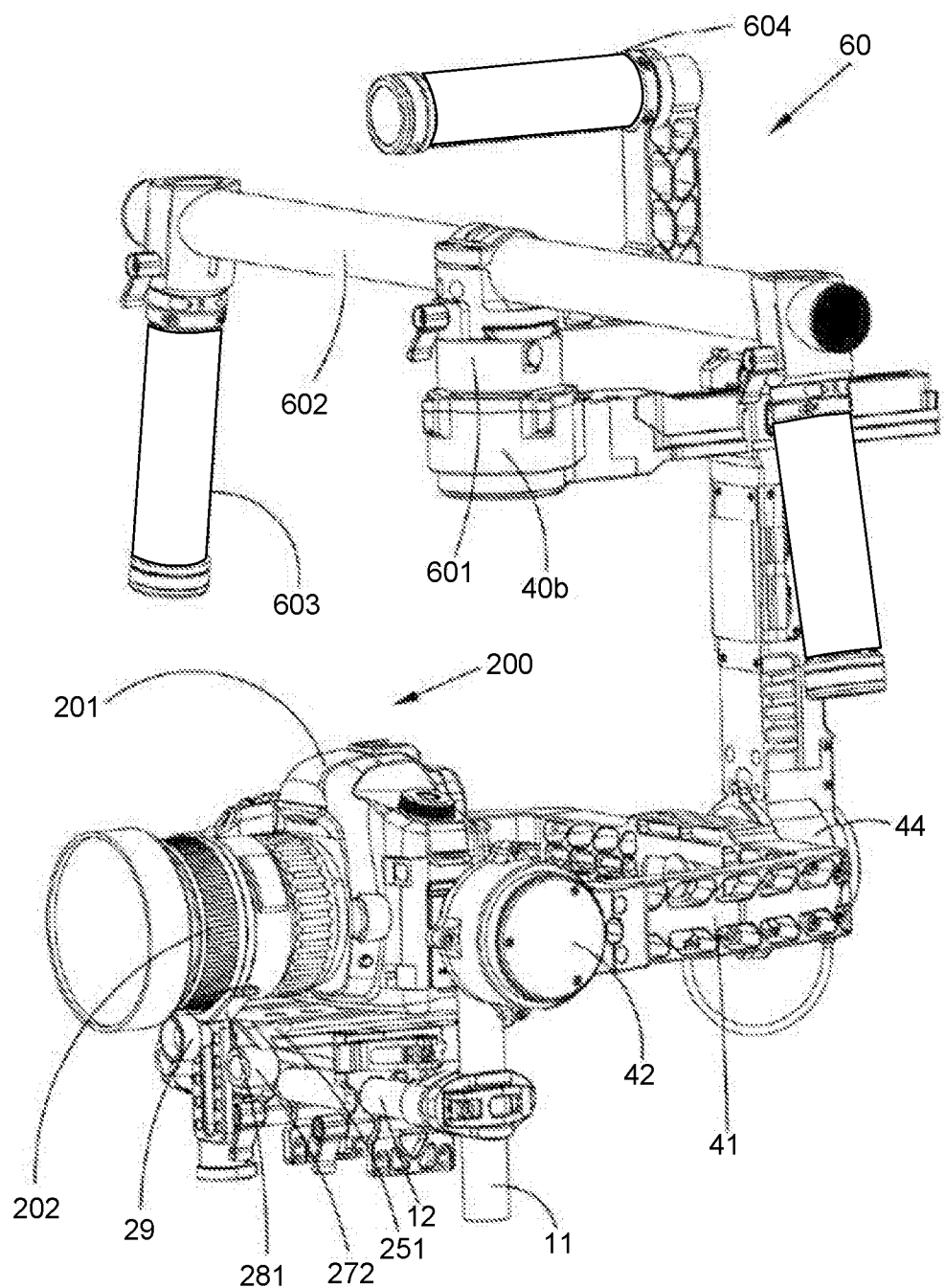
FIG. 9 is a diagram of the gimbal in FIG. 1 in use.

Referring to FIG. 1 to FIG. 2 together, a gimbal 100 according to the present disclosure is used for carrying an imaging device 200 (as shown in FIG. 9). The imaging device 200 may be a camera, a video camera, a lens or the like. In this embodiment, the imaging device 200 is a camera, which includes a body 201 and a lens 202 mounted to the body 201.

The gimbal 100 includes a first support frame 10, a lens bracket assembly 20 movably disposed on the first support frame 10, a second support frame 40 hinged to the first support frame 10 and capable of driving the first support frame 10 to rotate, a third support frame 40a hinged to the second support frame 40 and capable of driving the second support frame 40 to rotate, a driving portion 40b that drives the third support frame 40a to rotate, and a handle portion 60.

The first support frame 10 includes two first pillars 11, two guiding posts 12 and two first fastening devices 13. The two guiding posts 12 are disposed perpendicularly to the two first pillars 11. The two guiding posts 12 can move along a direction along the length of the first pillars 11 through the first fastening devices 13, and it is possible to fix the two guiding posts 12 to any position on the first pillars 11 through the first fastening devices 13.

Specifically, the first pillars 11 are cylindrical, and each of the first pillars 11 includes a connecting end 110. The connecting end 110 is provided with a through hole 111. In this embodiment, an axial direction of the through hole 111 is substantially perpendicular to the direction along the length of the first pillar 11. The through hole 111 is internally provided with a turning shaft 112, and it can be understood that the first pillars 11 may also be in another shape.

In this embodiment, the two guiding posts 12 are both cylindrical, and it can be understood that the guiding posts 12 may also be in another shape.

The two first fastening devices 13 both include a snapping hole 130, two receiving portions 132 disposed on two sides of the snapping hole 130, respectively, and a locking member 134.

An axial direction of the snapping holes 130 is substantially perpendicular to that of the receiving portions 132. The shape and size of the snapping holes 130 correspond to those of the first pillars 11, respectively. The two first pillars 11 are sleeved in one of the snapping holes 130, respectively.

Each of the receiving portions 132 is used for receiving one end of the guiding posts 12, respectively, to cause the two guiding posts 12 to be disposed substantially parallel.

The locking member 134 is used for locking the first fastening devices 13 to any position on the first pillars 11. Specifically, the locking member 134 is a lock latch, which is made of a metal material.

Referring to FIGS. 3-8 together, the lens bracket assembly 20 includes a first adaptor 23 slidably disposed on the guiding posts 12, a mounting plate 24, a supporting plate 25 slidably disposed on the mounting plate 24, a pressing device 26, a connecting member 27 mounted to one side of the supporting plate 25, a bracket 28 mounted to one side of the connecting member 27, and a fixing member 29 for fixing the connecting member 27 and the bracket 28 to one side of the supporting plate 25. The mounting plate 24 is fixed to the first adaptor 23. In this embodiment, the mounting plate 24 is fixed onto the first adaptor 23 through a bolt. The supporting plate 25 is slidably disposed on the mounting plate 24. The pressing device 26 is disposed on one side of the mounting plate 24, and the pressing device 26 is used for fixing the supporting plate 25 to any position on the mounting plate 24.

In order for the first adaptor 23 to be slidably adjusted, the first adaptor 23 includes a first pressing block 231 and a second pressing block 232 disposed oppositely, and two round slots 230 are formed between the first pressing block 231 and the second pressing block 232. The guiding posts 12 are inserted into the round slots 230, and the first pressing block 231 and the second pressing block 232 are jointly screwed by a first screw 233. The first screw 233 is tightened, and the first adaptor 23 is fixed onto the guiding posts 12. The first screw 233 is loosened, and the first adaptor 23 slides on the guiding posts 12 along a direction of the length of the guiding posts 12.

In this implementation manner, a nut of the first screw 233 is fixedly arranged at a first wrench 234. The first wrench 234 extends along a direction perpendicular to the length of the first screw 233. The first wrench 234 is pulled to rotate in a tightening direction of the first screw 233, and tightening of the first screw 233 is achieved. On the contrary, the first wrench 234 is pulled to rotate in a direction opposite to the tightening direction of the first screw 233, and loosening of the first screw 233 is achieved, thus by which sliding and fixing of the first adaptor 23 are adjusted. Definitely, in other implementation manners, the first adaptor 23 may also be automatically adjusted by using a lead screw mechanism.

The mounting plate 24 is fixed onto the second pressing block 232. The mounting plate 24 is an elongated rectangular block, which includes a first surface 241 away from the second pressing block 232 and two first sidewalls 242 disposed oppositely. The first surface 241 is vertically connected with the two first sidewalls 242 respectively. A first boss 243 is extended along a direction perpendicular to the first surface 241 from the first surface 241 at each of two opposing ends of the first surface 241. In this embodiment, the two first bosses 243 are integrally formed with the mounting plate 24, and outer sidewalls of the two first bosses 243 are respectively coplanar with the first sidewalls 242. Inner sidewalls of the two first bosses 243 are provided with a first sliding slot 2430, respectively. The first sliding slot 2430 may be a dovetail sliding slot or a T-shaped sliding slot. In this embodiment, the first sliding slot 2430 is a dovetail sliding slot.

One of the first sidewalls 242 is provided with a receiving groove 244, and the receiving groove 244 extends from the first sidewall 242 to the center close to the first surface 241. The receiving groove 244 penetrates part of the first boss 243 to cause the first boss 243 to form a notch 2431. The notch 2431 is in communication with the receiving groove 244. The receiving groove 244 includes a bottom 2441 and two side faces 2442 disposed perpendicularly to the bottom 2441. The bottom 2441 is substantially parallel to the first sidewall 242. The bottom 2441 is provided with a threaded hole 2440. The two side faces 2442 are substantially parallel and disposed oppositely. The two side faces 2442 are provided thereon with a first sliding portion 2443, respectively. In this embodiment, the two first sliding portions 2443 are both sliding slots.

The supporting plate 25 is provided with a plurality of evenly arranged screw holes 25a along the length of the supporting plate 25 for connecting the imaging device 200 by screwing. On the one hand, it is possible to use the plurality of screw holes 25a to adapt to many different specifications of the imaging device 200; on the other hand, it is also possible to use the plurality of screw holes 25a to adjust the position of the imaging device 200 on the supporting plate 25. In this embodiment, two outer sidewalls 25b of the supporting plate 25 are provided with second sliding slots 250, which match the first sliding slots 2430, at positions corresponding to the first sliding slots 2430. In this embodiment, the second sliding slots 250 are dovetail sliding slots correspondingly. The supporting plate 25 further includes a first side 251, and the first side 251 is vertically connected with the two outer sidewalls 25b. The first side 251 is provided with a first fixing hole 2512 and two second fixing holes 2513. The two second fixing holes 2513 surround the first fixing hole 2512.

The pressing device 26 includes a sliding block 261, a washer 262 received in the sliding block 261, a wrench 263, a pin 264, a fixing bolt 265, and a spring 266.

The sliding block 261 is slidably disposed in the receiving groove 244, and includes a first side face 2611 close to the bottom 2441 of the receiving groove 244, a second side face 2612 away from the first side face 2611, and two third side faces 2613 vertically connected with the first side face 2611 and the second side face 2612. The two third side faces 2613 are away from each other and substantially parallel to each other. A clamping portion 2614 is extended from the first side face 2611 in a direction in which the first side face 2611 gets close to the bottom 2441, and the clamping portion 2614 protrudes beyond the first side face 2611. Thus, the clamping portion 2614 forms an inclined face 2615 inclining with respect to the first side face 2611. In this embodiment, when the sliding block 261 slides to get close to the bottom 2441, sliding slots (not shown), of which the size and shape are the same as those of the first sliding slot 2430 respectively, are jointly formed between the first surface 241 of the mounting plate 24 and the inclined face 2615. The two third side faces 2613 are provided with second sliding portions 2616 at positions corresponding to the first sliding portions 2443, respectively. In this embodiment, the two second sliding portions 2616 are both sliders.

The second side face 2612 is provided with a rectangular-ambulatory-plane first receiving groove 2617. A column 2618 is formed in a central part of the first receiving groove 2617, and an outer side face of the column 2618 is flush with the second side face 2612. The column 2618 is provided with a round through hole 2619.

The shape and size of the washer 262 match those of the first receiving groove 2617 respectively. The thickness of the washer 262 may be greater than or equal to the depth of the first receiving groove 2617. In this embodiment, the thickness of the washer 262 is greater than the depth of the first receiving groove 2617. In this embodiment, the washer 262 is made of polyoxymethylene (POM).

The wrench 263 includes a rotating portion 2631 and a pulling portion 2632 away from the rotating portion 2631. The rotating portion 2631 extends towards the pulling portion 2632 to be provided with a first receiving portion 2634, and the first receiving portion 2634 penetrates the rotating portion 2631. A sidewall of the rotating portion 2631 is provided with a first through hole 2633. An axial direction of the first through hole 2633 is perpendicular to that of the through hole 2619 of the sliding block 261. The first receiving portion 2634 is in communication with the first through hole 2633.

The shape and size of the pin 264 match those of the first through hole 2633 respectively. In this embodiment, the center of the pin 264 is provided with a second through hole 2640.

The spring 266 is mounted between the first side face 2611 of the sliding block 261 and the bottom 2441 of the mounting plate 24.

When the pressing device 26 is assembled, the pin 264 is first inserted into the first through hole 2633, then the washer 262 is placed in the first receiving groove 2617. Afterwards, the fixing bolt 265 sequentially passes through the second through hole 2640, the through hole 2619, the spring 266, and the threaded hole 2440 at the bottom 2441 of the mounting plate 24, and is connected with the threaded hole 2440 by threading. The notch 2431 and the receiving groove 244 jointly receive the sliding block 261, and the rotating portion 2631 of the wrench 263 abuts against the washer 262.

In use, the supporting plate 25 cooperates with the first sliding slots 2430 of the mounting plate 24 through the second sliding slots 250 to cause the supporting plate 25 to slide on the mounting plate 24. When it is necessary to clamp the supporting plate 25 in the mounting plate 24, the wrench 263 is pressed, and the two second sliding portions 2616 and the two first sliding portions 2443 guide the sliding block 261 to slide towards the bottom 2441 in the receiving groove 244, such that the clamping portion 2614 of the sliding block 261 is retained in the second sliding slot 250 to achieve locking between the supporting plate 25 and the mounting plate 24. At this point, the inclined face 2615 is received in the notch 2461. On the contrary, when the wrench 263 is pulled, the wrench 263 moves away from the mounting plate 24 to achieve loosening between the supporting plate 25 and the mounting plate 24. Thus, sliding and fixing of the supporting plate 25 are adjusted.

In this embodiment, the washer 262 is made of POM to provide an amount of deformation and a better feel in handling when the wrench 263 is pressed.

The connecting member 27 includes a connecting portion 271 and two cylindrical fastening posts 272 disposed on two sides of the connecting portion 271. The connecting portion 271 is provided thereon with a first through hole 2711 and two second through holes 2712 at positions corresponding to the first fixing hole 2512 and the second fixing holes 2513 of the supporting plate 25, respectively. The two second through holes 2712 surround the first through hole 2711. The connecting member 27 is fixed to the first side 251 of the supporting plate 25. Specifically, the two second through holes 2712 are aligned with the two second fixing holes 2513, respectively, and then two latches are inserted into the second through holes 2712 and the second fixing holes 2513 to fix the connecting plate 27 onto the first side 251 of the supporting plate 25.

It can be understood that, in other embodiments, both the second through holes 2712 and the second fixing holes 2513 can be omitted, and the connecting member 27 is fixed to the supporting plate 25 directly through glue or welding, which is not limited to this embodiment.

In this embodiment, the bracket 28 is Y-shaped, and includes a supporting portion 281 of which the shape matches the lens 202 of the imaging device 200, and a fixing portion 282 connected with the supporting portion 281. In this embodiment, the supporting portion 281 is an arc-shaped structure, of which the radius is equal to that of the lens 202. The fixing portion 282 is provided with a guide hole 2820 and a plurality of round through holes 2822. The plurality of round through holes 2822 surround the guide hole 2820. The width of the fixing portion 282 is equal to the shortest distance between the two fastening posts 272.

In this embodiment, the fixing member 29 is a latch, and includes an assemble-in portion 291 and an abutting portion 292 connected to the assemble-in portion 291. The length of the assemble-in portion 291 is substantially equal to the sum of the depth of the first fixing hole 2512, the depth of the first through hole 2711, and the depth of the guide hole 2820. Therefore, after the assemble-in portion 291 sequentially passes through the guide hole 2820 and the first through hole 2711 and mates with the first fixing hole 2512 through interference fit, the abutting portion 292 abuts against the fixing portion 282, and at the same time, the fixing portion 282 is clamped between the two fastening posts 272 to avoid shaking of the bracket 28.

It can be understood that, in other embodiments, in order to save the manufacturing cost, the fixing member 29 may also be omitted, the connecting member 27 is fixed onto the first side 251 of the supporting plate 25 by glue, and the bracket 28 is fixed onto the connecting member 27 by glue.

It can be understood that, in other embodiments, in order to save the manufacturing cost, the connecting member 27 may also be omitted, and the bracket 28 is directly fixed onto the first side 251 of the supporting plate 25 through the fixing member 29 or glue.

The second support frame 40 includes two second pillars 41 and a first driving device 42. One of the second pillars 41 is directly hinged to a turning shaft 112 of one of the first pillars 11, and the other one of the second pillars 41 is hinged to a turning shaft 112 of the other one of the first pillars 11 through the first driving device 42. Specifically, the first driving device 42 is fixed to one end of the second pillar 41 close to the first pillar 11, and a driving shaft (not shown) of the first driving device 42 is fixedly connected with the turning shaft 112 of one of the first pillars 11 for driving the turning shaft 112 to rotate, hence driving the first support frame 10 to rotate. In this embodiment, an axial direction of the driving shaft of the first driving device 42 is substantially perpendicular to a direction along the length of the second pillar 41. The first driving device 42 drives the first support frame 10 to rotate to adjust a shooting angle of the imaging device 200 and timely adjust the rotational speed to adapt to various attitudes. In this embodiment, the first driving device 42 is a brushless motor. It can be understood that the first driving device 42 may also be a brush motor, or a motor, or the like, which is not limited to this embodiment.

The third support frame 40a includes a third pillar 43, a second driving device 44, and a connecting plate 45. The shape of the third pillar 43 is hollow and columnar. The second driving device 44 is rotationally connected to the second pillar 41 for driving the second support frame 40 to rotate. Specifically, the second driving device 44 is fixed to one end of the third pillar 43, and a driving shaft (not shown) of the second driving device 44 is fixedly connected with the second pillar 41 for driving the second pillar 41 to rotate, and hence driving the second support frame 40 to rotate. The other end of the third pillar 43 is connected to the connecting plate 45. The connecting plate 45 is substantially perpendicular to the third pillar 43 and is substantially parallel to the rotating shaft of the second driving device 44.

In this embodiment, the driving portion 40b is a brushless motor, of which the rotor is connected to the connecting plate 45 and the stator is fixed to the handle portion 60. The driving portion 40b is used for driving the third support frame 40a to rotate 360° in a horizontal direction.

The handle portion 60 is in a shape of a bent rod. Specifically, the handle portion 60 includes a first connecting portion 601, a first supporting portion 602, and a handgrip portion 603. The first supporting portion 602 is a rod member, and the first connecting portion 601 is fixedly connected to a geometric center of the first supporting portion 602. The first connecting portion 601 is connected to the driving portion 40b.

The handgrip portion 603 is two columnar handles, and the handgrip portion 603 is fixed to two ends of the first supporting portion 602.

The handgrip portion 60 is fixedly provided with a handle 604, and the handle 604 is fixed to one side of the first supporting portion 602 and is disposed oppositely to the first connecting portion 601, so that the handle 604 can be carried at will and save strength when the gimbal 100 is not used. Definitely, in other implementation manners, the handle portion 60 may also be provided with a locking mechanism, which is thus fixed onto an aerial ladder to achieve automatically moving of the gimbal 100 by machinery.

Referring to FIG. 9, one imaging device 200 is fixedly arranged on the lens bracket assembly 20 during operation. In order to increase the stability of the imaging device 200 in the shooting process, the center of gravity among the first support frame 10, the lens bracket assembly 20, and the imaging device 200 should fall on a rotary shaft of the first driving device 42. Through mechanical analysis, when the center of gravity among the first support frame 10, the lens bracket assembly 20, and the imaging device 200 should fall on the driving shaft of the first driving device 42, the first support frame 10 may not produce a rotating torque when rotating to any angle. That is, the first support frame 10 may not shake back and forth due to the torque, thus increasing the stability of the imaging device 200 in a rotating process.

When the gimbal 100 operates stably, the first support frame 10 and the imaging device 200 are also in a dynamic balanced state. When the center of gravity among the first support frame 10, the lens bracket assembly 20, and the imaging device 200 does not fall on the rotary shaft of the first driving device 42, the wrench 263 is pulled so that the wrench 263 moves away from the mounting plate 24, and loosening between the supporting plate 25 and the mounting plate 24 is achieved. Then, the supporting plate 25 is slid on the mounting plate 24 to finely tune the center of gravity of the first support frame 10 so as to cause the center of gravity among the first support frame 10, the lens bracket assembly 20, and the imaging device 200 to fall on the rotary shaft of the first driving device 42.

It can be understood that, in other implementation manners, it is also feasible that the first sliding portions 2443 are sliders and the second sliding portions 2616 are sliding slots.

It can be understood that, in other implementation manners, it is also feasible that the first sliding portions 2443 and the second sliding portions 2616 are omitted.

The bracket of the lens bracket assembly according to the present disclosure is fixed onto the supporting plate, the imaging device is mounted to the supporting plate, and the bracket supports the lens of the imaging device. Therefore, stiffness between the lens and a body of the imaging device is increased. In addition, the supporting plate is slidably disposed on the mounting plate, and the pressing device locks the supporting plate with the mounting plate. Therefore, the mounting plate can be locked to any predetermined position on the supporting plate through the pressing device, which increases the locking precision of the mounting plate. Moreover, the lens bracket assembly has a small volume and is easy to assemble and disassemble. The center of gravity of the gimbal can be adjusted through the lens bracket assembly.

The above descriptions are merely embodiments of the present disclosure, and are not intended to limit the patent scope of the present disclosure. Any equivalent structure or equivalent process variation made by using contents of the specification and the drawings of the present disclosure, or directly or indirectly applied to other related technical fields, should be likewise included in the scope of the present disclosure.

What is claimed is:

1. A lens bracket assembly for supporting an imaging device, the imaging device comprising a body and a lens connected to the body, the lens bracket assembly comprising:
    a mounting plate comprising a first surface and two inner sidewalls extended from two opposing ends of the first surface along a direction substantially perpendicular to the first surface, the two inner sidewalls providing first sliding slots;
    a supporting plate configured for carrying the imaging device, the supporting plate comprising a first side and two outer sidewalls providing second sliding slots, the supporting plate being slidably disposed on the mounting plate with the second sliding slots matching the first sliding slots at corresponding positions;
    a bracket coupled to the first side of the supporting plate, the bracket comprising a shape that matches the lens of the imaging device and a guide hole; and
    a fixing member, comprising:
        an assemble-in portion passing through the guide hole and a first fixing hole that is provided at the first side of the supporting plate; and
        an abutting portion connected to the assemble-in portion and abutting against the bracket.

2. The lens bracket assembly of claim 1, wherein both the first sliding slots and the second sliding slots are dovetail sliding slots.

3. The lens bracket assembly of claim 1, wherein the bracket comprises:

a supporting portion providing the shape to support the lens; and a fixing portion connected with the supporting portion and fixedly arranged at the first side of the supporting plate.

4. The lens bracket assembly of claim 1, wherein the mounting plate is configured for sliding along one or more guiding posts via a first adaptor, the first adaptor is configured for sliding on the one or more guiding posts along a length direction along the one or more guiding posts through one or more round slots, and one or more round slots are formed between a top pressing block and a bottom pressing block of the first adaptor and configured for accepting the one or more guiding posts.

5. The lens bracket assembly of claim 4, wherein the top pressing block and the bottom pressing block are jointly screwed by a first screw, a length of the first screw is extended along a direction substantially parallel to the first surface of the mounting plate, the mounting plate is fixed onto the top pressing block, and a nut of the first screw is fixedly arranged with a first wrench.

6. The lens bracket assembly of claim 5, wherein:
the first wrench extends along a direction substantially perpendicular to the length of the first screw;
the first wrench is configured to be pulled to (1) rotate in a locking direction of the first screw to lock the first screw, or (2) rotate in an unlocking direction opposite to the locking direction of the first screw to loosen the first screw;
when the first screw is locked, the first adaptor is fixed onto the one or more guiding posts; and
when the first screw is loosened, the first adaptor is capable of sliding on the one or more guiding posts.

7. The lens bracket assembly of claim 5, wherein the first wrench includes a rotating portion and a pulling portion away from the rotating portion, a first receiving portion is provided at the rotating portion extending towards the pulling portion, wherein the first receiving portion penetrates the rotating portion, and a sidewall of the rotating portion is provided with a first through hole.

8. The lens bracket assembly of claim 1, wherein the bracket comprises a guide hole, and the first side of the supporting plate is provided with a first fixing hole and one or more second fixing holes, and the lens bracket assembly further comprises:
a connecting member disposed between the first side and the bracket, wherein the connecting member comprises a connecting portion provided with a first through hole and one or more second through holes at positions aligned with the first fixing hole and the one or more second fixing holes of the supporting plate, and one or more latches are inserted into the one or more second through holes and the one or more second fixing holes to fix the connecting member onto the first side of the supporting plate; and
a fixing member comprising an assemble-in portion passing through the guide hole, the first fixing hole, and the first through hole.

9. The lens bracket assembly of claim 8, wherein a length of the assemble-in portion is equal to a sum of a depth of the first fixing hole, a depth of the first through hole, and a depth of the guide hole.

10. The lens bracket assembly of claim 8, wherein the connecting member further comprises two cylindrical fastening posts disposed on two sides of the connecting portion, and the fixing portion is clamped between the two fastening posts.

11. The lens bracket assembly of claim 1, wherein the mounting plate further comprises two first sidewalls disposed oppositely and facing away from the mounting plate, one of the first sidewalls is provided with a receiving groove.

12. The lens bracket assembly of claim 11, further comprising:
a pressing device comprising a sliding block slidably disposed in the receiving groove, wherein the sliding block comprises a first side face close to a bottom of the receiving groove, a clamping portion is extended from the first side face in a direction in which the first side face gets close to the bottom and is used for locking the supporting plate to the mounting plate, and when the sliding block is retained in one of the second sliding slots, the supporting plate and the mounting plate are locked through the clamping portion.

13. The lens bracket assembly of claim 12, wherein the bottom of the receiving groove is provided with a threaded hole, the pressing device further comprises a spring, a fixing bolt, a pin, and a wrench, the spring is disposed between the bottom and the first side face, the sliding block further comprises a second side face away from the first side face, the wrench is disposed on the second side face, the wrench is provided with a first through hole for receiving the pin, and the fixing bolt sequentially passes through the pin, the sliding block, and the spring to be connected with the threaded hole by threading.

14. The lens bracket assembly of claim 13, wherein the second side face is provided with a rectangular-ambulatory-plane first receiving groove, a column is formed in a central part of the first receiving groove, the column is provided with a round through hole for the fixing bolt to pass through, the pressing device further comprises a washer, a shape and a size of the washer match a shape and a size of the first receiving groove, respectively, and the washer is received in the first receiving groove and is in contact with the wrench.

15. The lens bracket assembly of claim 14, wherein a thickness of the washer is greater than or equal to a depth of the first receiving groove.

16. The lens bracket assembly of claim 14, wherein the washer is made of polyoxymethylene.

17. The lens bracket assembly of claim 11, wherein the receiving groove comprises two side faces disposed substantially perpendicular to a bottom of the receiving groove, the two side faces are disposed oppositely and are provided with first sliding portions, and the two outer sidewalls of the supporting plate are provided with second sliding portions that match the respective first sliding portions.

18. The lens bracket assembly of claim 17, wherein:
the first sliding portions are sliding slots and the second sliding portions are sliders; or
the first sliding portions are sliders, and the second sliding portions are sliding slots.

19. A gimbal for carrying an imaging device, the gimbal comprising:
a support frame comprising one or more pillars and one or more guiding posts, the one or more guiding posts being substantially perpendicular to the one or more pillars; and
a lens bracket assembly disposed on the one or more guiding posts and being used for carrying the imaging device, the lens bracket assembly comprising:
a mounting plate comprising a first surface and two inner sidewalls extended from two opposing ends of the first surface along a direction perpendicular to the first surface, the two inner sidewalls providing first sliding slots;

a supporting plate configured for carrying the imaging device, the supporting plate comprising a first side and two outer sidewalls providing second sliding slots, the supporting plate being slidably disposed on the mounting plate with the second sliding slots matching the first sliding slots at corresponding positions;

a bracket coupled to the first side of the supporting plate, the bracket comprising a shape that matches a lens of the imaging device and a guide hole; and a fixing member, comprising:
  an assemble-in portion passing through the guide hole and a first fixing hole that is provided at the first side of the supporting plate; and
  an abutting portion connected to the assemble-in portion and abutting against the bracket.

* * * * *